United States Patent [19]
Okada et al.

[11] Patent Number: 5,971,112
[45] Date of Patent: Oct. 26, 1999

[54] DRUM BRAKE ASSEMBLY AND BRAKE SHOES FOR SAME

[75] Inventors: Norihisa Okada, Kanagawa; Takeo Moriya, Toky, both of Japan

[73] Assignee: Tokyo Buhin Kogyo Co., Ltd., Kanagawa, Japan

[21] Appl. No.: 08/793,603

[22] PCT Filed: Aug. 29, 1995

[86] PCT No.: PCT/JP95/01713

§ 371 Date: Jul. 25, 1997

§ 102(e) Date: Jul. 25, 1997

[87] PCT Pub. No.: WO96/16275

PCT Pub. Date: May 30, 1996

[30] Foreign Application Priority Data

Nov. 19, 1994 [JP] Japan .................................. 6-309673
Nov. 19, 1994 [JP] Japan .................................. 6-309674

[51] Int. Cl.[6] ............................................ F16D 51/00
[52] U.S. Cl. .................................. 188/250 B; 188/250 E; 188/251 A
[58] Field of Search ............................ 188/250 E, 250 B, 188/251 A, 251 M, 250 C, 250 G

[56] References Cited

FOREIGN PATENT DOCUMENTS

| | | |
|---|---|---|
| 56-167924 | 12/1981 | Japan . |
| 5-912197 | 1/1984 | Japan . |
| 62-218683 | 9/1987 | Japan . |
| 6-366632 | 5/1988 | Japan . |
| 6412143 | 1/1989 | Japan . |
| 5264569 | 5/1997 | Japan . |

OTHER PUBLICATIONS

Copy of PCT Search Report issued in PCT/JP95/01713.
An English language Abstract of JP 56–167924.
An English Language abstract of JP 64–12143.
An English Language Abstract of JP 52–64569.
An English Language abstract of JP 59–12197.
An English Language abstract of JP 62–218683.

Primary Examiner—Robert J. Oberleitner
Assistant Examiner—Pamela J. Lipka
Attorney, Agent, or Firm—Greenblum & Bernstein P.L.C.

[57] ABSTRACT

In a drum brake for a vehicle in which a pair of brake shoes 4 and 5 having an identical size are pressed against an inner face of a brake drum 1 so as to effect braking, a natural frequency of one (4) of said pair of brake shoes 4 and 5 is made different from a natural frequency of the other (5). Due to the difference in the respective natural frequencies of the right and left brake shoes 4 and 5, coupled vibrations between the brake drum 1 and the two brake shoes 4 and 5 are hard to cause, whereby it is effective in drastically reducing opportunities of generating "judder."

9 Claims, 11 Drawing Sheets

| DECELERATION | 0.1G | | 0.15G | | 0.2G | | 0.25G | | 0.3G | |
|---|---|---|---|---|---|---|---|---|---|---|
| SPEED / KIND | A | B | A | B | A | B | A | B | A | B |
| 10 k/H | — | — | ② | — | ② | — | ① | — | — | ② |
| 20 k/H | ② | — | ② | — | ② | — | ② | — | — | ② |
| 30 k/H | ① | — | ② | — | ② | — | ② | — | — | ② |
| 50 k/H | ② | — | ③ | — | ② | — | ② | — | — | — |

A: CONVENTIONAL

B: PRESENT INVENTION

Fig. 20

| DECELERATION SPEED \ KIND | 0.1G | | 0.15G | | 0.2G | | 0.25G | | 0.3G | | 0.35G | | 0.4G | |
|---|---|---|---|---|---|---|---|---|---|---|---|---|---|---|
| | A | B | A | B | A | B | A | B | A | B | A | B | A | B |
| 10 k/H | — | — | — | — | — | — | — | — | ① | — | ① | — | ① | — |
| 20 k/H | — | — | — | — | ① | — | ① | — | ① | — | ① | — | ① | — |
| 30 k/H | — | — | — | — | — | — | — | — | ② | — | ① | — | ② | — |
| 50 k/H | — | — | — | — | — | — | ① | — | ① | — | ② | — | ① | — |

A: CONVENTIONAL

B: PRESENT INVENTION

Fig. 21

| DECELERATION SPEED \ KIND | 0.1G | | 0.15G | | 0.2G | | 0.25G | | 0.3G | | 0.35G | | 0.4G | |
|---|---|---|---|---|---|---|---|---|---|---|---|---|---|---|
| | A | B | A | B | A | B | A | B | A | B | A | B | A | B |
| 10 k/H | — | — | — | — | — | — | — | — | ① | — | ① | — | ① | — |
| 20 k/H | — | — | — | — | ① | — | ① | — | ① | — | ① | — | ① | — |
| 30 k/H | — | — | — | — | — | — | — | — | ② | — | ① | — | ② | — |
| 50 k/H | — | — | — | — | — | — | ① | — | ① | ① | ② | — | ① | — |

A: CONVENTIONAL

B: PRESENT INVENTION

5,971,112

DRUM BRAKE ASSEMBLY AND BRAKE SHOES FOR SAME

FIELD OF THE INVENTION

The present invention relates to a drum brake for a vehicle and, in particular, to a drum brake for a vehicle provided with a mechanism for preventing "judder."

BACKGROUND ART

Various studies have conventionally been made concerning so-called "judder" which occurs in drum brakes for a vehicle at the time of braking and thereby generates noise, and many inventions and designs have been produced as measures against "judder."

They are classified, for example, into the following categories: 1) in which the rigidity of the brake shoe is enhanced so as to attain a natural frequency shifted from the frequency at which "judder" is generated; 2) in which the material of the brake lining is changed; 3) a weight (damper weight) is secured to a part of the brake shoe where a large amplitude is exhibited at the time when "judder" is generated; and 4) in which, as disclosed in Japanese Utility Model Publication No. 5-27711, a friction material is pressed against the inner peripheral surface of the brake shoe so as to relatively slide in the circumferential direction of the shoe at the time when "judder" is generated, thereby consuming the vibration energy of the shoe.

According to the recent studies about "judder," it has been considered suitable for the mechanism for generating "judder" to be defined as coupled vibrations of the brake drum and two brake shoes.

Namely, as shown in FIG. 1, in a drum brake for a vehicle in which a pair of brake shoes 4 and 5 each having one end swingingly supported by a bracket 3 by way of a pin 2, for example, are disposed within a brake drum 1, while the other ends of the brake shoes 4 and 5 are opened by a cam 6 which is swung by a non-depicted actuator, such that linings 7 attached to the outer faces of the shoes 4 and 5 are pressed against the inner peripheral surface of the brake drum 1 so as to effect braking; when the above-mentioned "judder" occurs, the brake drum 1 vibrates in modes indicated by a continuous line 8 in FIGS. 4 and 5 (wherein FIGS. 4 and 5 respectively refer to the third- and fourth-order modes), whereas the brake shoes 4 and 5 vibrate in a mode indicated by a continuous line 9 in FIG. 6. Here, according to modal analysis, the vibration of the brake shoes 4 and 5 generates first-order twisting shown in (a) and (a') in FIG. 7 and first-order bending shown in (b) and (b') in the same drawing, as well as second-order twisting shown in (a) in FIG. 8 and second-order bending shown in (b) in the same drawing. The complex vibrations of the brake drum 2 and brake shoes 4 and 5 are coupled together, whereby coupled vibrations such as those shown in FIGS. 9, 10 (first-order mode), and 11 (second-order mode) are generated.

While FIGS. 12 and 13 show examples of brake shoes, the brake drum 1 as well as the brake shoes 4 and 5 have a number of natural frequencies at which the above-mentioned coupled vibrations are generated.

In each of the above-mentioned measures against "judder" 1) to 4), a natural frequency of the brake drum 1 or pair of brake shoes 4 and 5 is changed.

Since the brake drum 1 and the pair of brake drums 4 and 5 each have a number of natural frequencies as mentioned above, however, even when a certain natural frequency generating "judder" in the brake drum and/or pair of brake shoes is changed, the above-mentioned coupled vibrations may occur at other frequencies again and thereby generate "judder."

As a result of studies, the inventors have found that "the above-mentioned coupled vibrations are hard to cause at a plurality of natural frequencies including those of the brake drum and the like" when respective natural frequencies of a pair of right and left brake shoes, which are one of primary factors for causing the above-mentioned coupled vibrations, are made different from each other; and have associated this finding with the present invention. It is an object of the present invention to provide a drum brake for a vehicle in which vibrations generating "judder" are absorbed by a simple configuration and "judder" is less likely to occur than in the conventional drum brakes.

It is another object of the present invention to provide a drum brake for a vehicle which can be easily produced and can effectively suppress the above-mentioned "judder" by merely adding a simple processing to or changing the material of one or both of normal brake shoes having the same size.

DISCLOSURE OF THE INVENTION

The drum brake for vehicle in accordance with the present invention is a drum brake for vehicle in which a pair of brake shoes having the same size are pressed against the inner face of a brake drum so as to effect braking, wherein a natural frequency of one of the pair of brake shoes is made different from a natural frequency of the other brake shoe.

In the drum brake for vehicle in accordance with the present invention, since the respective natural frequencies of the right and left brake shoes are different from each other, the above-mentioned coupled vibrations are hard to cause, whereby opportunities of generating "judder" are reduced.

BRIEF DESCRIPTION OF THE DRAWINGS

FIG. 20 is a chart showing the effect upon "judder" in the third embodiment of the drum brake for a vehicle in accordance with the present invention; and FIG. 21 is a chart showing the effect upon "judder" in the fourth embodiment of the drum brake for a vehicle in accordance with the present invention.

BEST MODES FOR CARRYING OUT THE INVENTION

Figure 1:
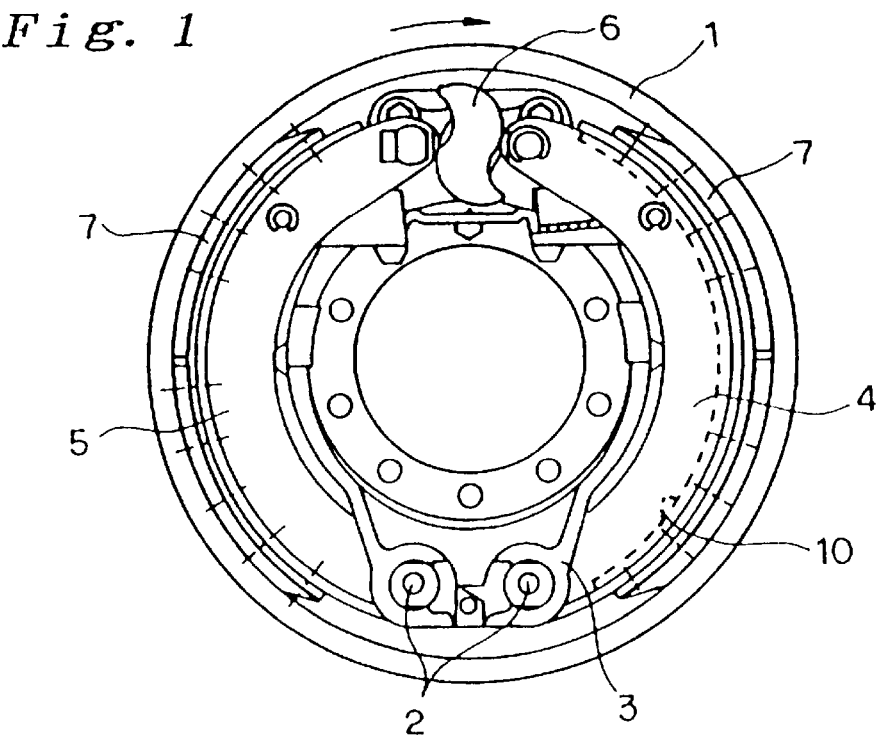
FIG. 1 is a front view of a first embodiment of the drum brake for a vehicle in accordance with the present invention.
Figure 2:
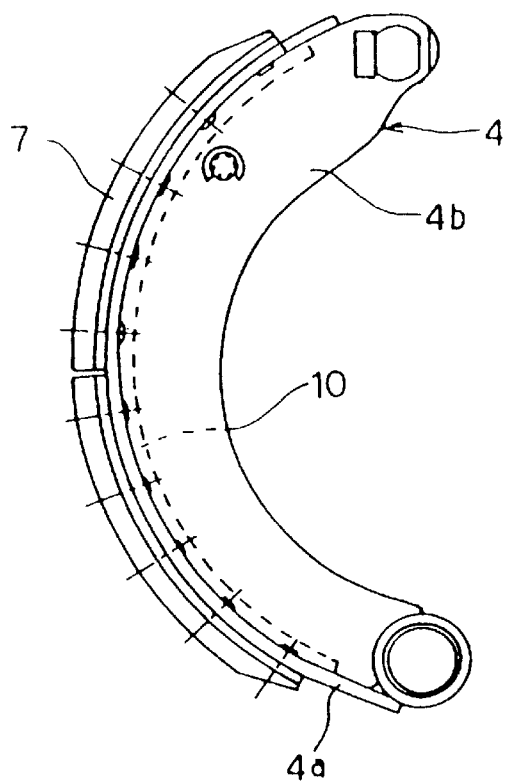
FIG. 2 is a side view of one brake shoe in the first embodiment of the drum brake for vehicle in accordance with the present invention.
Figure 3:
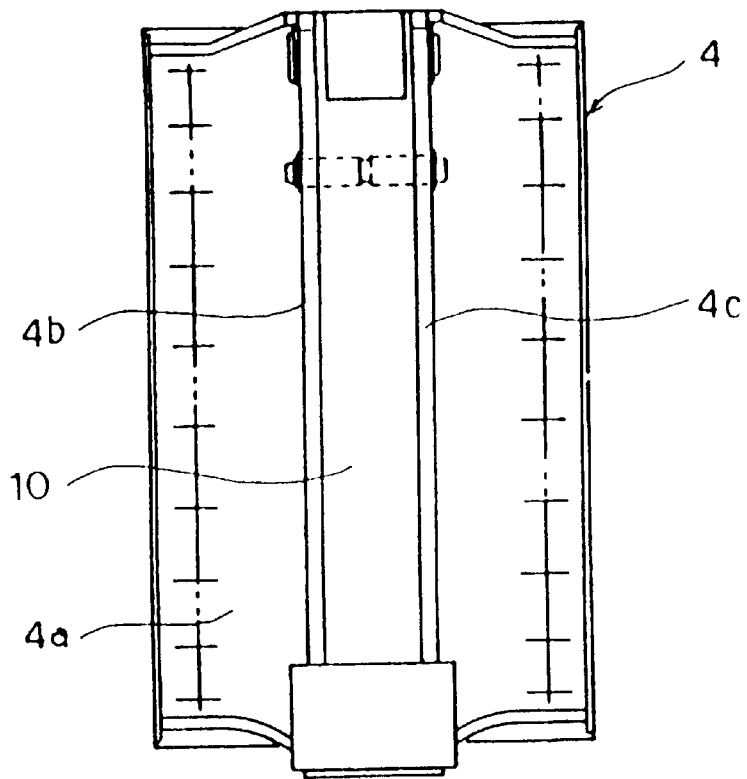
FIG. 3 is a bottom view of one brake shoe in the first embodiment of the drum brake for a vehicle in accordance with the present invention.

A first embodiment of the drum brake for a vehicle in accordance with the present invention will be explained in detail with reference to FIGS. 1 to 3. For example, a brake shoe 4, which becomes a leading shoe with respect to a brake drum 1 rotating in the direction of arrow, is configured such that, as shown in FIGS. 2 and 3, between webs 4b and 4c projecting from the rear face of a rim 4a, an elongated board 10 having substantially the same board thickness as that of the webs 4b and 4c is welded and secured to substantially the whole length of the webs 4b and 4c near the rim 4a. By contrast, a brake shoe 5, which becomes a trailing shoe with respect to the rotation of the brake drum 1, is not modified at all in this embodiment.

Figure 12:
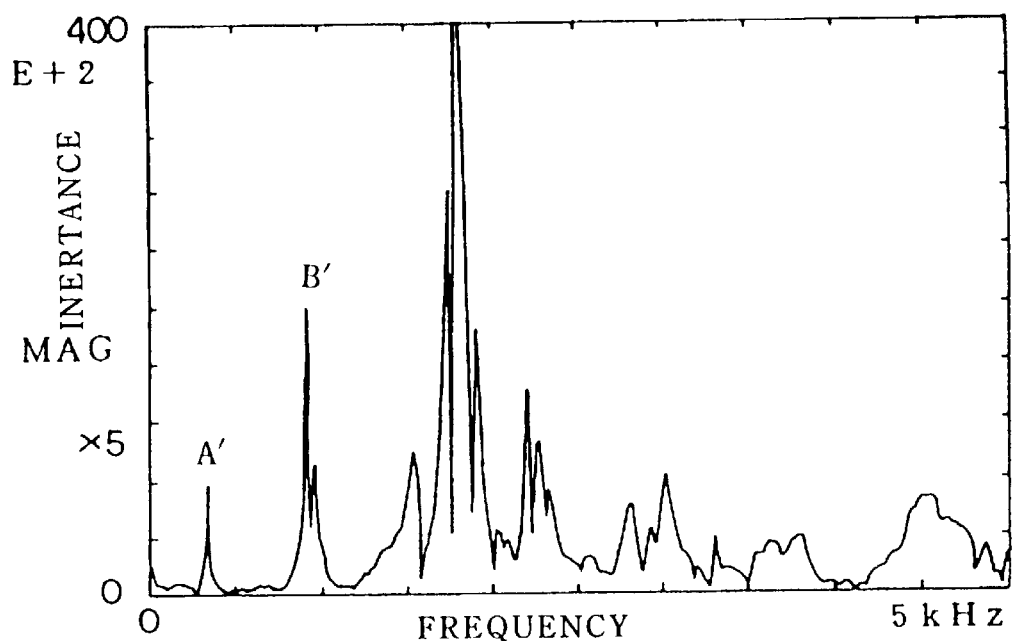
FIG. 12 is a chart showing a distribution of natural frequencies and their strength in a brake shoe which is not in accordance with the present invention.
Figure 13:
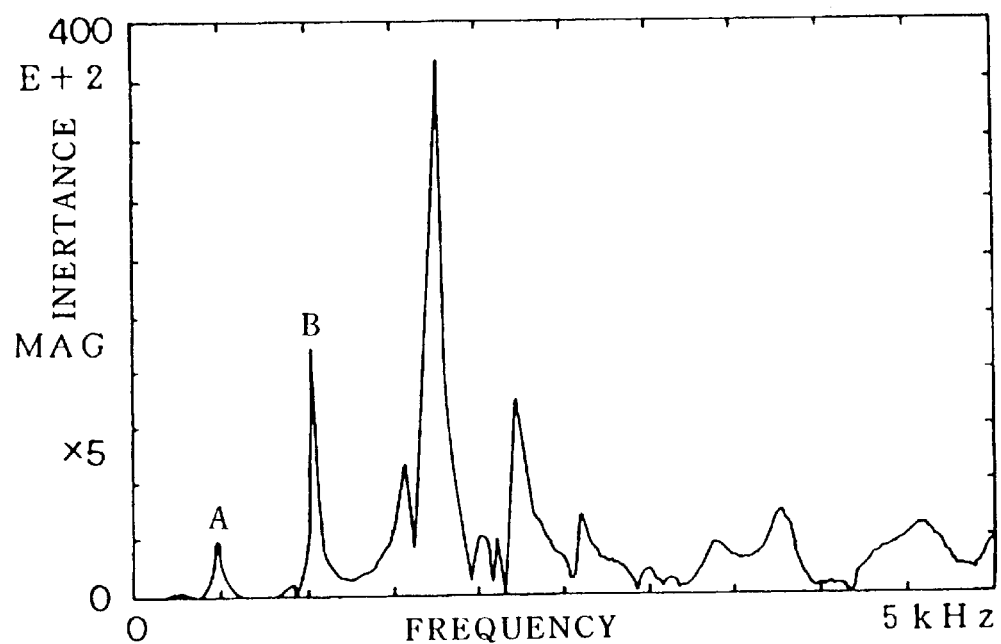
FIG. 13 is a chart showing a distribution of natural frequencies and their strength in a brake shoe in accordance with the present invention.

Accordingly, the rigidity of the brake shoe 4 is higher than that of the brake shoe 5, whereby the natural frequencies of the former are set higher than those of the latter by about 15% to 50%. Namely, while peak levels of some natural frequencies at which "judder" is likely to occur in the brake shoe 4 are A' (340 Hz) and B' (920 Hz) as shown in FIG. 12, they are A (500 Hz) and B (1050 Hz) which are respectively higher than the former levels by 47% and 15%, thereby yielding differences in natural frequency between the brake shoes 4 and 5.

Figures 18, 19:
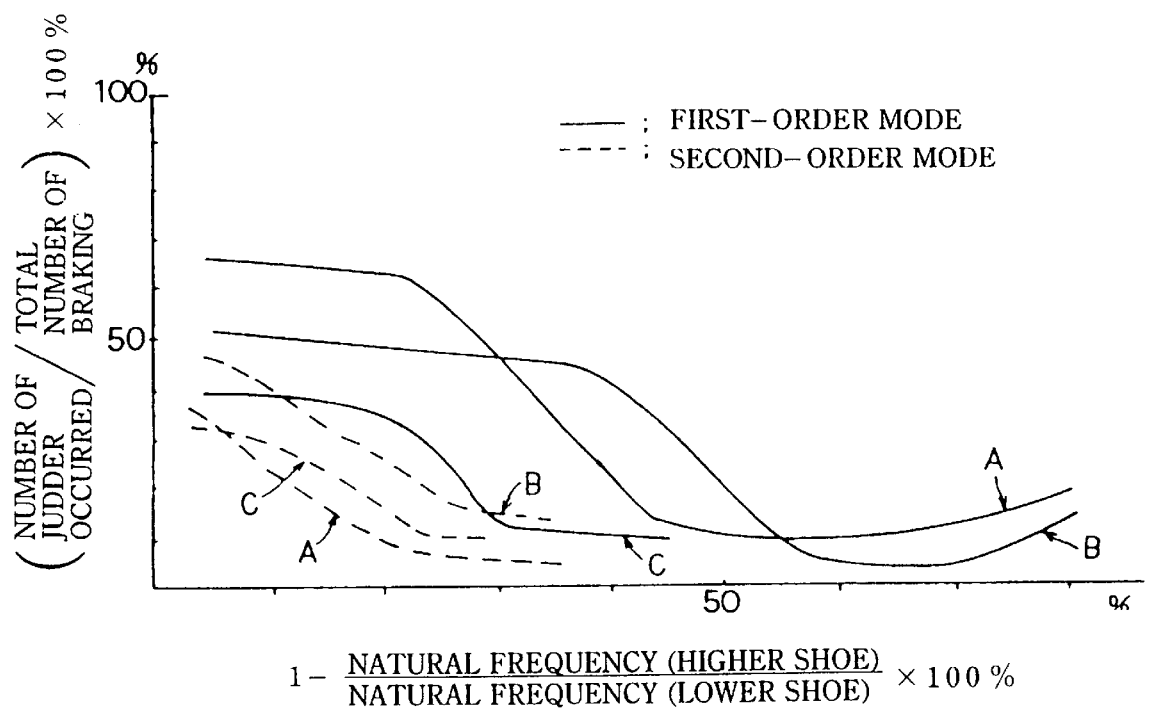
FIG. 18 is a chart showing the relationship between the ratio of difference in natural frequency between a pair of brake shoes and the ratio at which "judder" occurs.
FIG. 19 is a chart showing the effect upon "judder" in the first embodiment of the drum brake for a vehicle in accordance with the present invention.

According to experiments performed by the inventors, while the ratio at which "judder" occurs due to the difference (ratio) of natural frequencies between the right and left brake shoes 4 and 5 changes as indicated by A, B, and C in FIG. 18 depending on differences in natural frequency of the brake drum 1 to which the shoes are attached, the ratio at which "judder" occurs is minimized when the difference between natural frequencies is within the range of 20% to 70%. The level of the ratio at which "judder" occurs unfavorably becomes high when the above-mentioned difference is less than 20% or more than 70%.

As means for making the respective natural frequencies of the above-mentioned pair of brake shoes 4 and 5 different from each other, one of the pair of brake shoes, e.g., 4, may be made of cast iron having a high natural frequency, while the other 5 may be made of a steel plate having a low natural frequency (second embodiment).

In this manner, not only the coupled vibrations are hard to cause, thereby reducing the opportunities of generating "judder" as with the case mentioned above, but also the brake shoes can be produced similarly to the normal brake shoes since only the material of brake shoes is changed.

Figure 4:
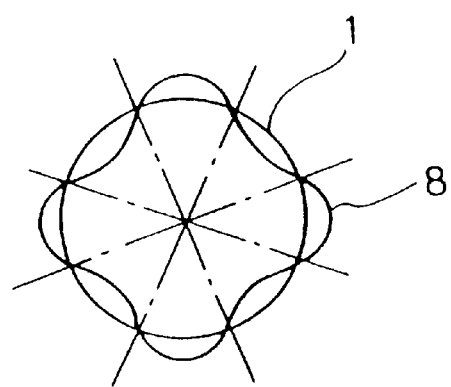
FIG. 4 is a view showing a mode of third-order vibration of a brake drum.
Figure 5:
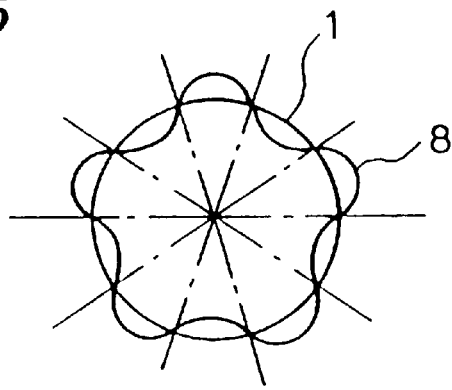
FIG. 5 is a view showing a mode of fourth-order vibration of a brake drum.
Figure 6:
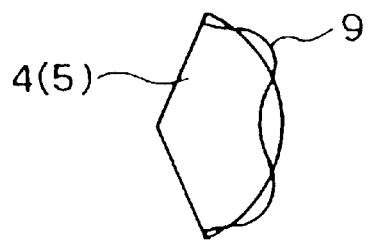
FIG. 6 is a view showing a vibration mode of a brake shoe.
Figure 7A:
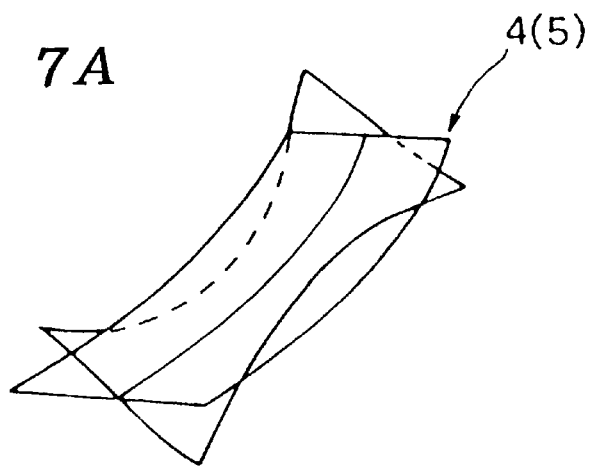
FIG. 7 is a modal analysis chart, in which (a) and (a') show first-order twisting, whereas (b) and (b') show first-order bending.
Figure 7A:
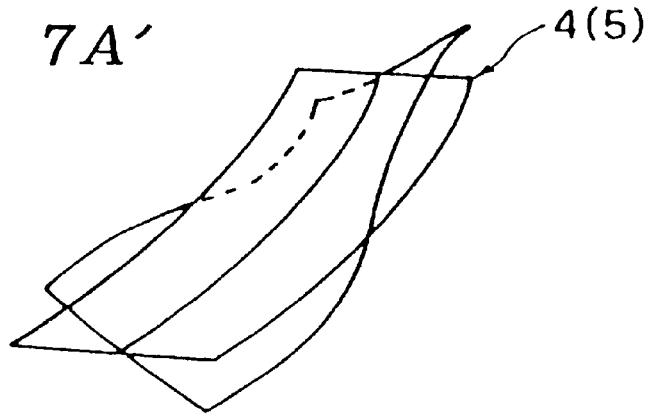
Figure 7B:
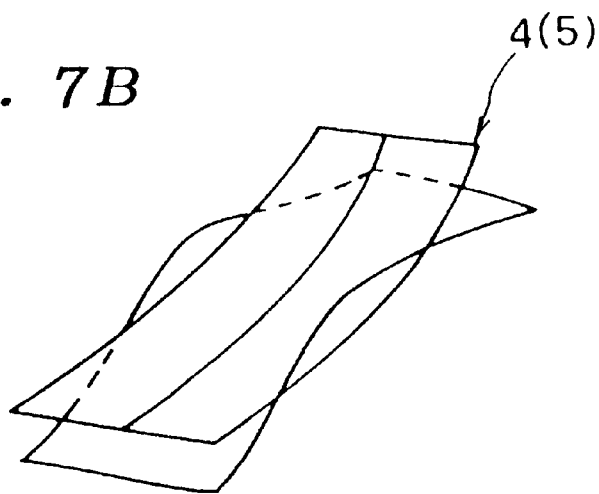
Figure 7B:
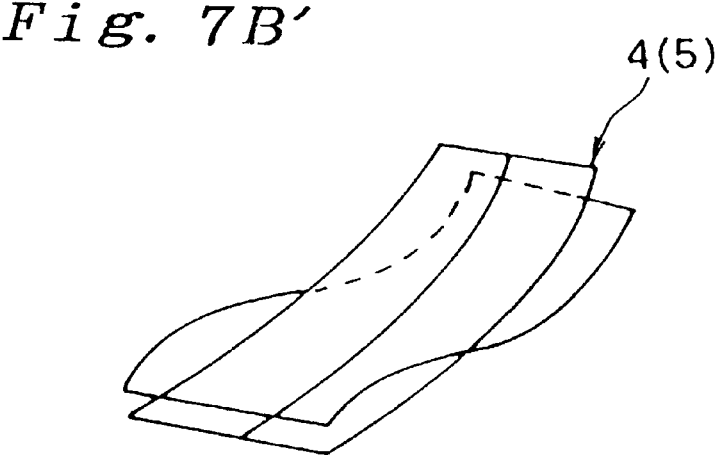
Figure 8A:
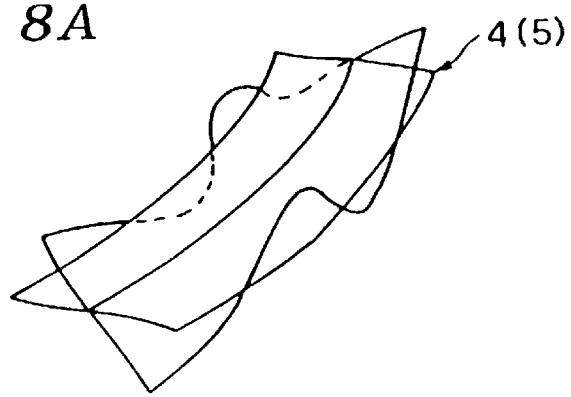
FIG. 8 is a modal analysis chart of a brake shoe, in which (a) shows second-order twisting, whereas (b) shows second-order bending.
Figure 8B:
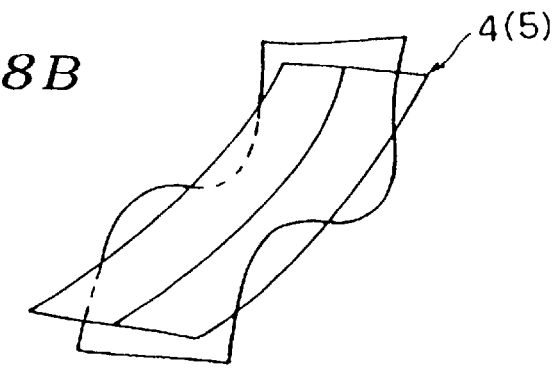
Figure 9:
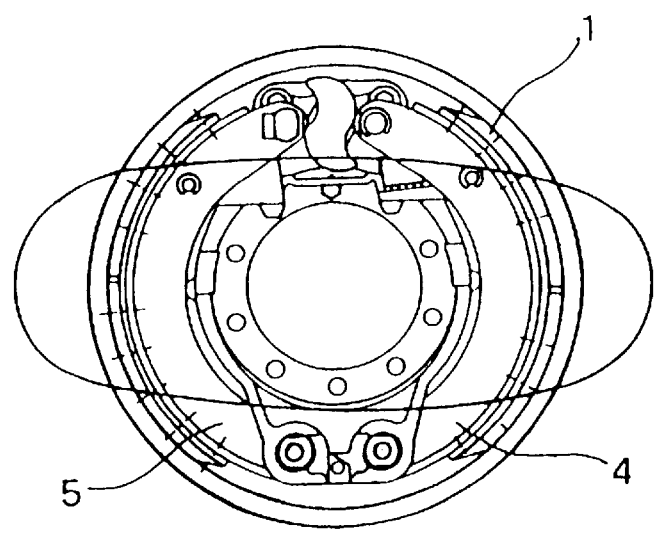
FIG. 9 is a chart of first-order vibration mode in a drum brake for a vehicle.
Figure 10:
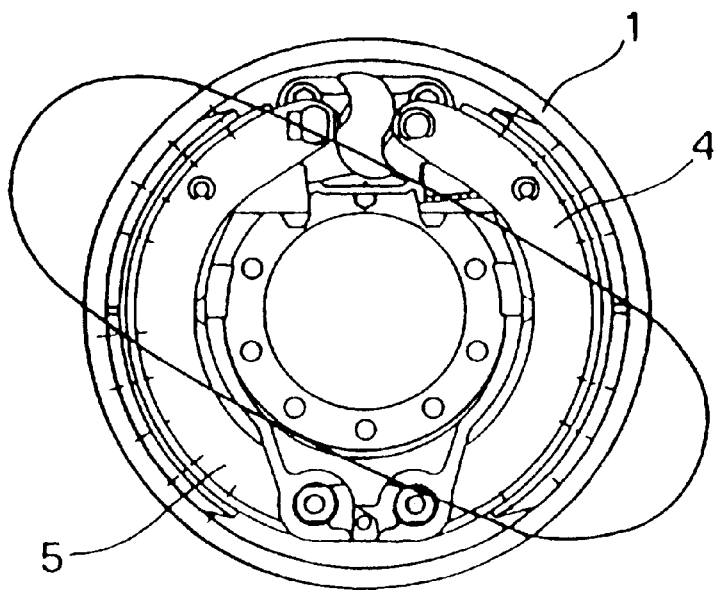
FIG. 10 is another chart of first-order vibration mode in a drum brake for a vehicle.
Figure 11:
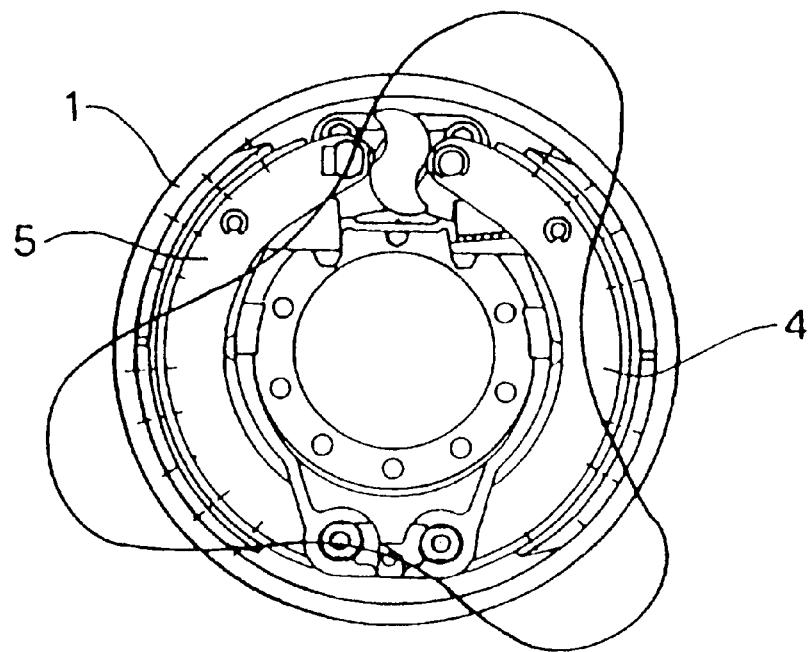
FIG. 11 is a chart of second-order vibration mode in a drum brake for a vehicle.
Figure 14:
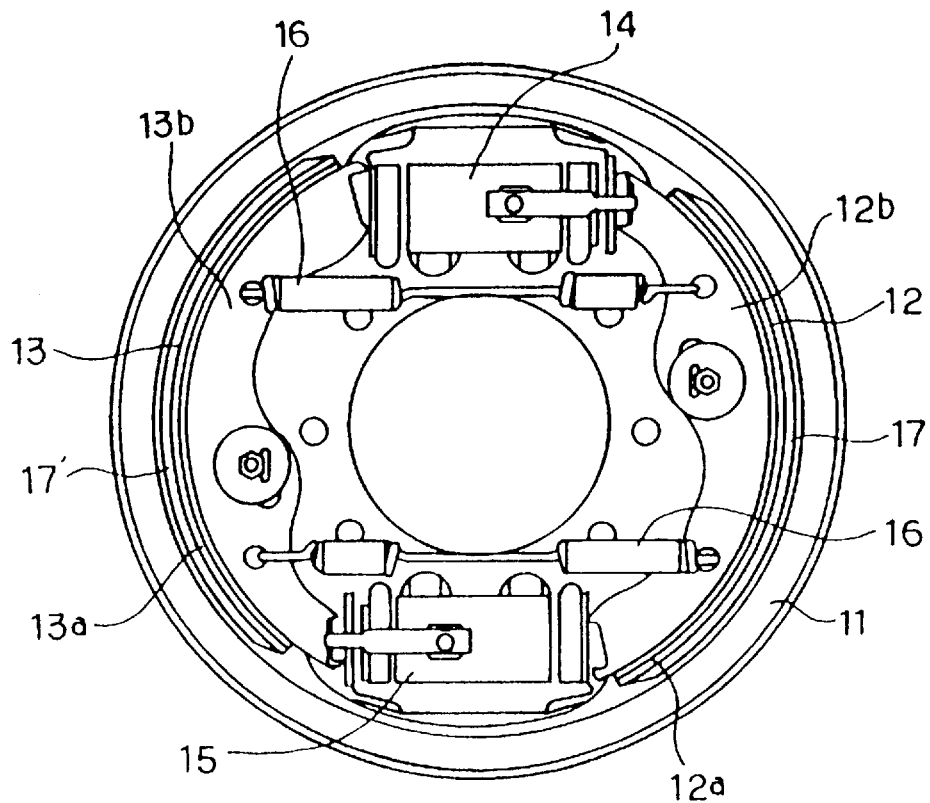
FIG. 14 is a front view of a third embodiment of the drum brake for a vehicle in accordance with the present invention.
Figure 15:
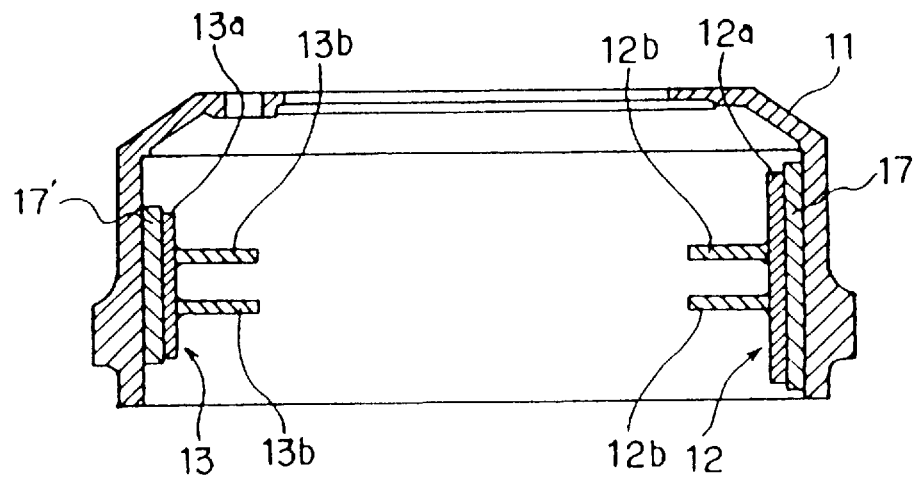
FIG. 15 is a cross-sectional view of the third embodiment of the drum brake for a vehicle in accordance with the present invention.

Further as means for making the respective natural frequencies of the above-mentioned pair of brake shoes 4 and 5 different from each other, there is a third embodiment shown in FIGS. 14 and 15. Namely, FIG. 14 shows a drum brake of double-acting 2-leading (2L) type. This drum brake is configured such that, between opposed end portions of a pair of brake shoes 12 and 13 symmetrically disposed within a brake drum 11, wheel cylinders 14 and 15 having two pistons respectively moving in directions opposite to each other are disposed. At the time when the cylinders 14 and 15 are operated, linings 17 and 17', as a whole, are pressed against the drum 11 such that both ends of the shoes 12 and 13 are opened against springs 16. At the time when "judder" occurs, as mentioned above, there are the vibrations of the brake drum 11 indicated by the continuous curve 8 shown in FIGS. 4 and 5 and the vibrations of the brake shoes 12 and 13 indicated by the continuous curve 9 shown in FIG. 6, thereby yielding the above-mentioned coupled vibrations between the brake drum 11 and two brake shoes 12 and 13.

In the third embodiment, as shown in FIG. 15, both of the brake shoes 12 and 13 are configured such that webs 12b and 13b project from the rear surfaces of respective rims 12a and 13a to which the linings 17 and 17' are attached, while one of the above-mentioned leading shoes, e.g., shoe 13, has smaller widths at both its rim 13a and lining 17' than their corresponding rim 12a and lining 17 of the other shoe 12.

To what extent the width of the brake shoe 13 is made smaller than that of the brake shoe 12 is determined by an experiment or the like. According to studies conducted by the inventors, favorable results have been obtained when the width of the brake shoe 13 is set with respect to that of the brake shoe 12 such that the first-order natural frequency of the former differs (increases) from the latter by about 10% to 30%.

Also, according to the experiments performed by the inventors, due to the difference in natural frequency between the right and left brake shoes 12 and 13 whose widths are made different from each other by the ratio mentioned above, the ratio at which "judder" occurs has drastically been reduced to 0%, whereas it was 30% in the conventional drum brake using the right and left brake shoes having the same width.

Also, in the drum brake shown in FIG. 14, even when one of the leading shoes 12 and 13 is made to have a width smaller than the other, it can attain a sufficient braking force due to its 2-leading type configuration, while the amount of abrasion of lining of the other shoe is suppressed to a level which is not different from the normal amount, whereby its weight can also be reduced.

Figure 16:
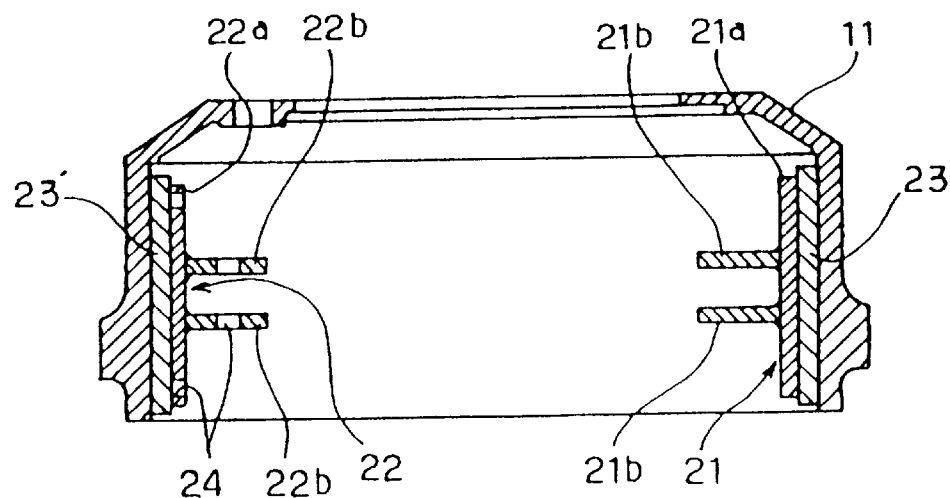
FIG. 16 is a cross-sectional view of a fourth embodiment of the drum brake for a vehicle in accordance with the present invention.
Figure 17:
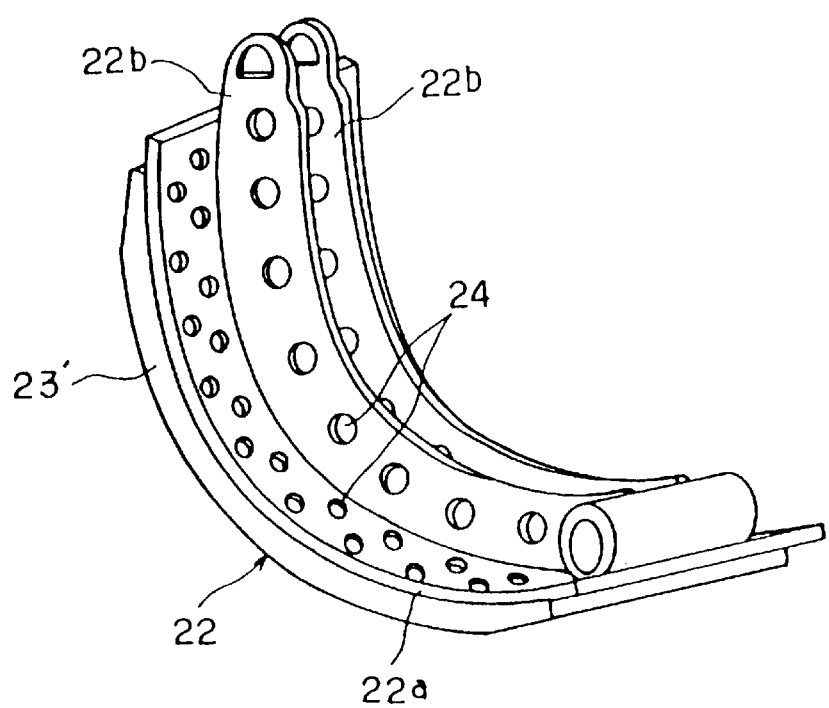
FIG. 17 is a perspective view of a brake shoe in the fourth embodiment of the drum brake for a vehicle in accordance with the present invention.

In a fourth embodiment shown in FIGS. 16 and 17, as means for making the respective natural frequencies of the above-mentioned pair of brake shoes different from each other, a number of holes are formed in one of the pair of brake shoes. Namely, while both of brake shoes 21 and 22 are configured such that webs 21b and 22b respectively project from the rear surfaces of rims 21a and 22a to which linings 23 and 23' are attached, one of the leading shoes, e.g., shoe 22, is uniformly provided with holes 24 at its rim 22a and web 22b.

Though the number and size of the holes 24 formed in the brake shoe 22 are determined by an experiment or the like, according to the studies conducted by the inventors, favorable results have been obtained when the holes 24 are set such that the first-order natural frequency of the brake shoe 22 differs (decreases) from that of the brake shoe 21 by about 10% to 30%.

Also, according to the experiments performed by the inventors, due to the difference in natural frequency between the right and left brake shoes 21 and 22 one of which has holes with the ratio mentioned above, the ratio at which "judder" occurs has drastically been reduced to 0.9%, whereas it was 30% in the drum brake using the conventional brake shoes.

Also, in the drum brake shown in FIG. 14, even when a number of holes are formed in one of the leading shoes, it can attain a sufficient braking force due to its 2-leading type configuration, while the amount of abrasion of lining of the other shoe is suppressed to a level which is not different from the normal amount, whereby its weight can also be reduced.

In the drum brake for a vehicle in accordance with the present invention, in which a pair of brake shoes having the same size are pressed against the inner face of the brake drum so as to effect braking, a natural frequency of one of the pair of brake shoes is made different from a natural frequency of the other brake shoe. Accordingly, due to the difference in the respective natural frequencies of the right and left brake shoes, the above-mentioned coupled vibrations are hard to occur, thereby reducing opportunities of generating "judder."

FIG. 19 shows circumstances where "judder" occurs when a vehicle equipped with the drum brake of the above-mentioned first or second embodiment runs at a speed of 10 km/hr to 50 km/hr and is then stopped at a deceleration of 0.1 G to 0.3 G. A vehicle equipped with a drum brake for vehicle having no measures against "judder" generates, at most of the vehicle speeds and decelerations, level 1 or 2 of "judder" in 1 to 5 sound levels which increase from weak "judder" to loud "judder." By contrast, in the vehicle equipped with the drum brake for vehicle having measures against "judder" in accordance with the present invention, no "judder" occurs at normal decelerations, though "judder" on the order of level 2 occurs only at a high deceleration, whereby the effectiveness of the present invention can be confirmed.

FIG. 20 shows circumstances where "judder" occurs when a vehicle equipped with the drum brake of the above-mentioned third embodiment runs at a speed of 10 km/hr to 50 km/hr and is then stopped at a deceleration of 0.1 G to 0.4 G. A vehicle equipped with a drum brake for a vehicle with right and left brake shoes having the same width generates, at almost all the vehicle speeds and decelerations, level 1 or 2 of "judder" in 1 to 5 sound levels (number in circle indicating the level) which increase from weak "judder" to loud "judder." By contrast, in the vehicle equipped with the drum brake for a vehicle in accordance with this embodiment, no "judder" occurs at all the vehicle speeds and decelerations, whereby the effectiveness of the present invention can be confirmed.

FIG. 21 shows circumstances where "judder" occurs when a vehicle equipped with the drum brake of the above-mentioned fourth embodiment runs at a speed of 10 km/hr to 50 km/hr and is then stopped at a deceleration of 0.1 G to 0.4 G. A vehicle equipped with a drum brake for a vehicle having right and left brake shoes identical to each other generates, at most of the vehicle speeds and decelerations, level 1 or 2 of "judder" in 1 to 5 sound levels (number in circle indicating the level) which increase from weak "judder" to loud "judder." By contrast, in the vehicle equipped with the drum brake for a vehicle in accordance with this embodiment, though "judder" occurs at only one vehicle speed with one deceleration, no "judder" occurs in the other vehicle speeds and decelerations, whereby the effectiveness of the present invention can be confirmed.

We claim:

1. A pair of brake shoes utilized in a drum brake assembly, comprising:

a first brake shoe, comprising a rim and a web;

a lining to be affixed to said rim of said first brake shoe; and a second brake shoe, comprising a rim and a web;

a lining to be affixed to sad rim of said second brake shoe; and wherein said rim and said web of said first brake shoe are manufactured of a first material that differs from a second material used to manufacture said rim and said web of said second brake shoe, so that a natural vibration frequency of said first brake shoe differs from a natural vibration frequency of said second brake shoe.

2. The pair of brake shoes utilized in a drum brake assembly of claim 1, wherein said rim and said web of one of said pair of brake shoes is made of cast iron, and said rim and said web of a remaining one of said pair of brake shoes is made of steel, so that said natural vibration frequency of said first brake shoe differs from said natural vibration frequency of said second brake shoe.

3. The pair of brake shoes utilized in a drum brake assembly of claim 2, wherein said steel comprises a steel plate.

4. The pair of brake shoes utilized in a drum brake assembly of claim 1, wherein said natural vibration frequency of said first brake shoe differs from said natural vibration frequency of said second brake shoe within a range of 20 percent to 70 percent.

5. A drum brake assembly, comprising:

a first brake shoe, comprising a rim and a web;

a lining to be affixed to said rim of said first brake shoe; and a second brake shoe, comprising a rim and a web;

a lining to be affixed to said rim of said second brake shoe;

a drum; and wherein said rim and said web of said first brake shoe are manufactured of a first material that differs from a second material used to manufacture said rim and said web of said second brake shoe, so that a natural vibration frequency of said first brake shoe differs from a natural vibration frequency of said second brake shoe.

6. The drum brake assembly of claim 5, wherein one of said first material and said second material comprises cast iron, and a remaining one of said first material and said second material comprises steel.

7. The drum brake assembly of claim 5, wherein said natural vibration frequency of said first brake shoe differs from said natural vibration frequency of said second brake shoe within a range of 20 percent to 70 percent.

8. A pair of brake shoes for a drum brake of a vehicle, comprising:

a leading shoe having a first natural vibration frequency;

a trailing shoe having a second natural vibration frequency that differs from said first natural vibration frequency, wherein one of said leading shoe and said trailing shoe is manufactured from cast iron, while a remaining one of said leading shoe and said trailing shoe is manufactured from steel.

9. The brake shoes of claim 8, wherein said leading shoe is manufactured from steel, and said trailing shoe is manufactured from cast iron.

* * * * *

UNITED STATES PATENT AND TRADEMARK OFFICE
CERTIFICATE OF CORRECTION

PATENT NO.   : 5,971,112
DATED        : October 26, 1999
INVENTOR(S)  : N. OKADA et al.

It is certified that error appears in the above-identified patent and that said Letters Patent is hereby corrected as shown below:

At column 6, line 21 (claim 1, line 7) of the printed patent, "sad" should be ---said---.

Signed and Sealed this

Twentieth Day of February, 2001

Attest:

NICHOLAS P. GODICI

Attesting Officer        Acting Director of the United States Patent and Trademark Office